United States Patent [19]
Sweet et al.

[11] Patent Number: 6,058,372
[45] Date of Patent: May 2, 2000

[54] INTERACTIVE SELF-SERVICE HARD DRIVE COPYING SYSTEM

[76] Inventors: Stephen R. Sweet, 19348 Carriger Rd., Sonoma, Calif. 95476; Ralph J. Kloepping, P.O. Box 1619, Bothel, Wash. 98041

[21] Appl. No.: 09/330,510

[22] Filed: Jun. 11, 1999

[51] Int. Cl.[7] .............................. G06F 5/00; G06F 13/10
[52] U.S. Cl. .............................. 705/16; 705/26; 705/17; 709/200; 709/212; 709/213; 711/100; 711/115
[58] Field of Search .................................. 705/16, 17, 26; 711/100, 115; 709/200, 212, 213

[56] References Cited

U.S. PATENT DOCUMENTS

| | | | |
|---|---|---|---|
| 5,771,354 | 5/1999 | Crawford | 395/200 |
| 5,901,228 | 5/1999 | Crawford | 380/25 |

OTHER PUBLICATIONS

"Off the Shelf," Computer Retail Week, N. 198, p. 76, 1998.

Goldwasser, Romi "Guarding the gate," Computer Shopper, vol. 16, N. 3, p. 606(3), Mar. 1997.

*Primary Examiner*—Emanuel Todd Voeltz
*Assistant Examiner*—Phillip Groutt

[57] ABSTRACT

A stand-alone, interactive, self-service kiosk for initializing and copying computer hard drives and methods for the operation of the kiosk are disclosed. The kiosk, which includes a microprocessor, data storage and printer, is programmed to conduct a dialogue with a customer instructing them to connect their original and replacement hard drives to the kiosk. Once the hard drives are connected, the microprocessor automatically identifies the original and replacement hard drives, configures the replacement hard drive and copies all programs and data from the original hard drive to the replacement hard drive. When the copying process is complete, a printed report is generated with further instructions on installation of the hard drive and detailed information about any errors that may have occurred during the process. In a second embodiment, the kiosk includes a device to accept a payment card from the customer, and a telephone modem to connect to a central office for verification of funds. In a third embodiment the kiosk includes a removable media storage device with which the customer can make a backup of their hard drive. In a fourth embodiment the kiosk includes software for the optimization of the location of the programs and data on the replacement hard drive. In a fifth embodiment the kiosk includes a database of known computer viruses and software for the detection and removal of those viruses. In a sixth embodiment a database of video advertisements is stored in the kiosk which can be presented to the customer through multimedia devices. In a seventh embodiment a database of software titles is stored in the kiosk which the customer can choose to purchase and install automatically to their replacement hard drive.

16 Claims, 4 Drawing Sheets

INTERACTIVE SELF-SERVICE HARD DRIVE COPYING SYSTEM

BACKGROUND

1. Field of Invention

This invention relates to computer hard drives, specifically to the setup and installation of replacement or additional computer hard drives, and the copying of existing operating systems, programs and data from one hard drive to another hard drive.

2. Description of Prior Art

Installing an additional or replacement hard drive into a personal computer is a complicated task, requiring an understanding of setting configuration jumpers, operation of partitioning and formatting software, installing operating system software, and copying large amounts of data and programs from one hard drive to another.

Skilled technicians are normally required to perform these tasks, and the entire operation can take up to several hours. Special knowledge of disk drives is required.

With the explosion in the sales of personal computers came the computer do-it-yourselfer, and large volume sales of computer accessories, peripherals and add-on devices including hard drives. Computer retail stores, mail order and even non-computer related discount stores carry large inventories of computer hard drives, and sell them directly to the consumer with little or no technical support. Most customers who then attempt to install these hard drives themselves either fail entirely or end up making many tech-support calls to the drive manufacturer before succeeding. Many who do finally succeed in physically installing the new drive end up losing part or all of their existing software installations and data from their old hard drive.

Drive manufacturers and other software manufacturers have tried to remedy this problem by writing software that makes it easier to perform the partitioning, formatting and data copying operations of the process. Drive manufacturers have also attempted to develop installation manuals that make setting configuration jumpers and making electrical connections easier for the customer. Although these methods have helped, it is still a lengthy process with little guarantee of complete success.

In addition, in the case of drives that use the Integrated Drive Electronics ("IDE") interface, one drive must be set up as a master drive and the other as a slave. Drives of different manufacture are often not compatible in this master/slave configuration. This prevents the possibility of copying the existing data from the original drive to the replacement drive directly. Tape backup or other means must be used to transfer data, and the average consumer does not often have the resources to do this. U.S. Pat. No. 5,777,811 issued Jul. 7, 1998 to Bodo provided a data duplicating system for copying digital data between information storage devices. This device was designed primarily for portability by using a small footprint. However this system was designed for use by computer technicians and computer manufacturers where drive cable configurations and drive jumper settings were understood in detail. This system copied the data from the first hard drive to the second hard drive exactly, thus did not permit the reorganization of the data for optimization, nor did it inspect any of the data for the presence of computer viruses or damaged data other than physical defects on the drive itself, nor did it accommodate drives with different partition sizes. Finally this system did not interact with the customer through an interactive multimedia interface nor did it present the customer with a printed report with instructions for the final steps of the installation.

SUMMARY OF THE INVENTION

This invention simplifies the installation of an additional or replacement computer hard drive by providing an interactive self-service kiosk at the store where the hard drive is purchased or other convenient location. The customer simply plugs the original and replacement hard drives into the kiosk using easily accessible power and data cables. The kiosk automatically determines the configuration of each drive and then performs all of the operations necessary to partition, format and copy all of the data from the original drive to the replacement drive. Partition sizes are scaled proportionally to the hard drive's capacity. In addition, other operations on the data are optionally performed during the copy process, such as optimization of the data by reorganizing its physical location on the drive, computer virus scanning, data backup and installation of new software. Finally a printed report of the operation is supplied to the customer, detailing statistics of the operation such as errors encountered in the data during transfer, and simplified instructions on the final installation steps that are required specific to the drive model and manufacturer.

The entire process of setup, configuration, partitioning, formatting, copying, optimization and virus scanning will be reduced in time considerably. Instead of the usual hour or more of time required to perform these operations, this invention will complete the process in approximately 15 minutes based on computer speeds and hard drive sizes of today's standards. This is accomplished by using software and hard drive controllers optimized for the task of copying data.

Drives of different size, make and configuration are accommodated without the necessity of changing configuration jumpers or switches on either drive by using independent controller channels for each hard drive and software which automatically detects each hard drive's current configuration.

The kiosk will interact with the customer by using graphics and audio that tell the customer exactly how to plug each of the drives into the kiosk, letting them know the progress of the operations as well as assisting them if any error conditions occur. In addition, the kiosk is able to present audio and video advertising before and during drive copy operations.

In one embodiment the kiosk will accept the customer's payment card as payment for the service, and will authorize the payment using a telephone modem connected to a central office either by standard phone connection or by wireless modem.

BRIEF DESCRIPTION OF THE DRAWINGS

A clearer understanding of the present invention will be apparent from the following description and the drawings, wherein.

DESCRIPTION

Figure 1:
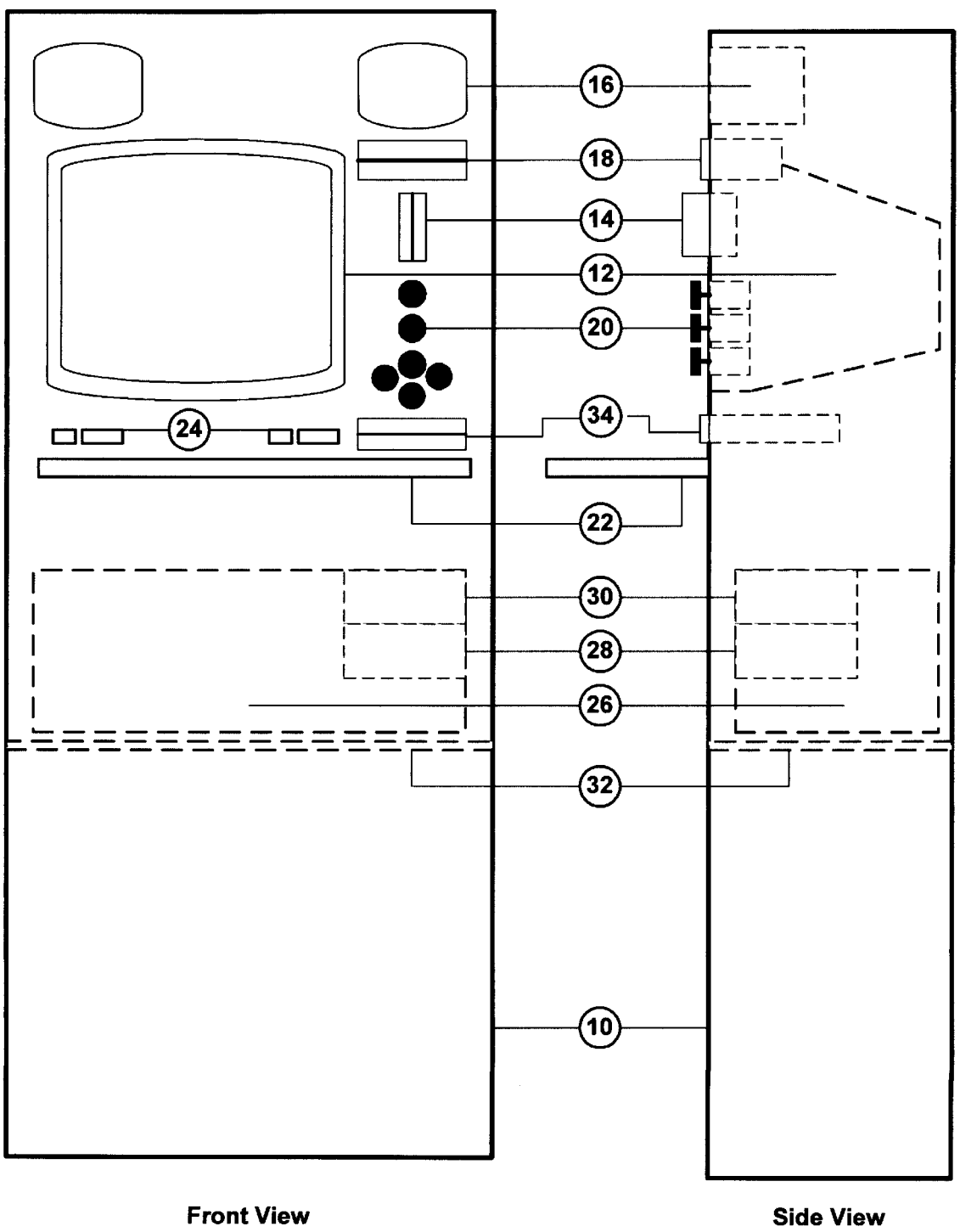
FIG. 1 is an elevation view of a typical configuration of a stand-alone self-service kiosk of the invention.

A stand-alone interactive self-service kiosk of the invention is shown in FIG. 1. The kiosk comprises a housing 10 and a video display 12. A magnetic card reader 14 is positioned to the right of the display to accept payment for the use of the kiosk. In order to make audible sound, a pair of amplified speakers 16 are installed above the screen. A printer 18 is positioned to the right of the screen for providing a report of the operation to the customer. Push buttons 20 provide input from the customer. A platform area 22 is provided to support the original and replacement hard drives. Power and data cables 24 for the customer's hard drives are accessible at the rear of the platform.

Figure 2:
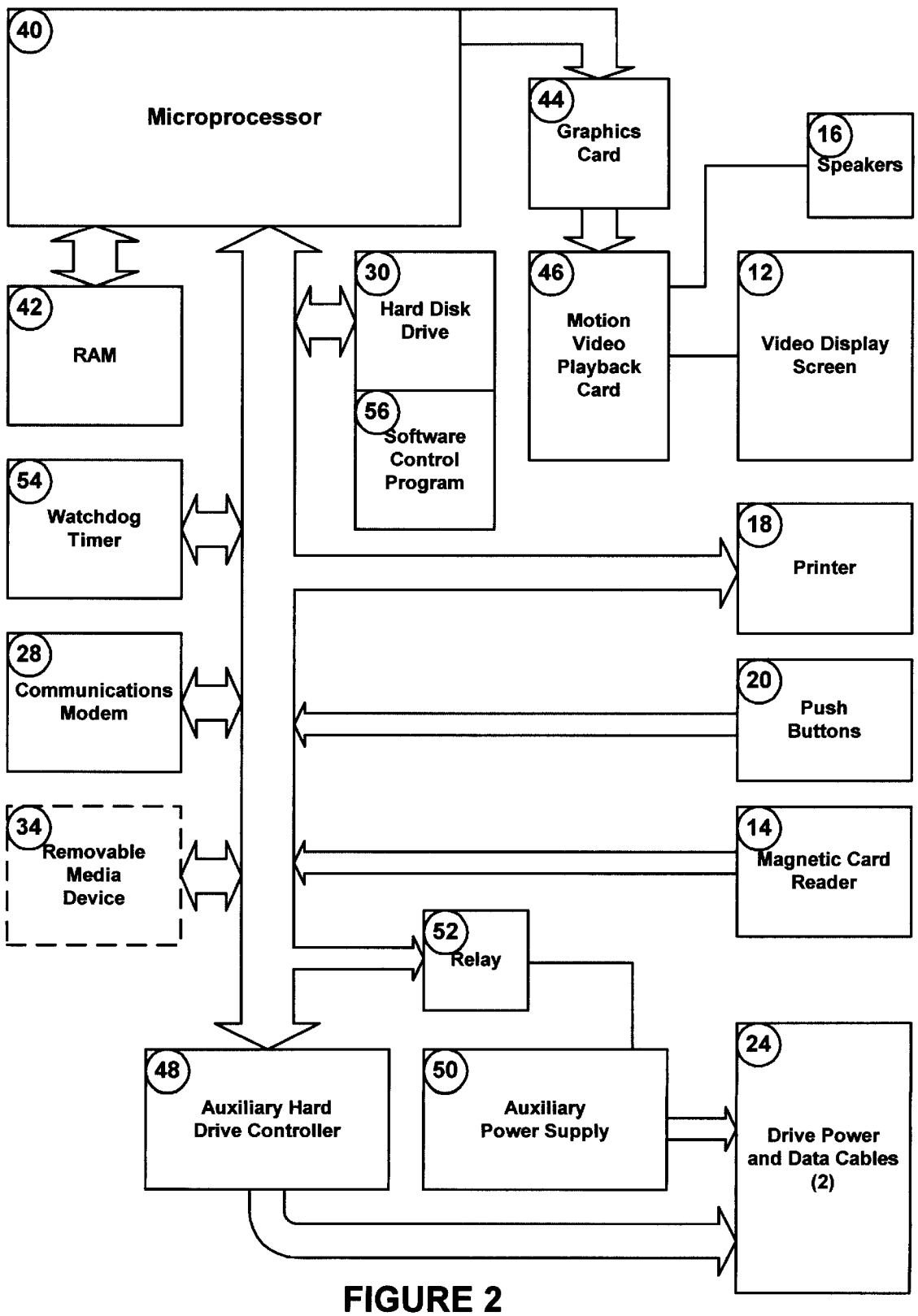
FIG. 2 is a block diagram of the circuit components of the kiosk.

A number of components are shown in dash line within the housing. The circuit components of the kiosk 26, including a power supply, microprocessor, RAM, watchdog timer, communications modem 28, video display controller, audio controller, internal hard drive controller, secondary hard drive controller, internal hard disk drive 30 and miscellaneous interface controller, as shown in FIG. 2, are supported on a shelf 32 inside the housing. In one embodiment, a DVD recorder 34 or other removable media storage device is mounted to the right of the screen to supply the customer with a backup copy of the data.

As shown in FIG. 2, a stand-alone self-service kiosk 10 of the invention includes a microprocessor 40, which, in addition to a microprocessor chip, includes all necessary and ancillary computer circuitry to enable functioning as a computer, one or more RAMs 42, and the fixed or hard disk drive 30. A software control program 56 is stored on the hard disk drive 30 which is used by the microprocessor to performs the steps shown in FIG. 3 And FIG. 4. A video display screen 12 is associated with graphics card 44 and DVD/MPEG motion video playback circuitry 46 for generating images on the display screen 12 through which the kiosk communicates with the customer. Speakers 16 are associated with the motion video playback card which communicates with the customer using voice and other sound. As mentioned above, the printer 18 delivers a printed copy of diagnostic and setup information to the customer. Push buttons 20 provide the customer with means to communicate with the system and are read by the microprocessor through a digital input port. An auxiliary hard drive controller 48 provides the interface to the original and replacement hard drives via cables accessible to the customer 24. An auxiliary power supply 50 provides power to the customer's hard drives and can be turned on and off through software control using relay 52. A watchdog timer 54 resets all system circuits automatically in the event of software or hardware failure. A magnetic card reader 14 provides the customer with means to make payment for the service. A communications modem 28 provides means whereby the system can verify credit card purchases and provide other transaction information to a central office. In addition, the modem provides means for remote administration and remote software updates of the system. A removable media device 34 is provided in one embodiment to supply the customer with a backup copy of the information from their hard drive.

Figure 3:
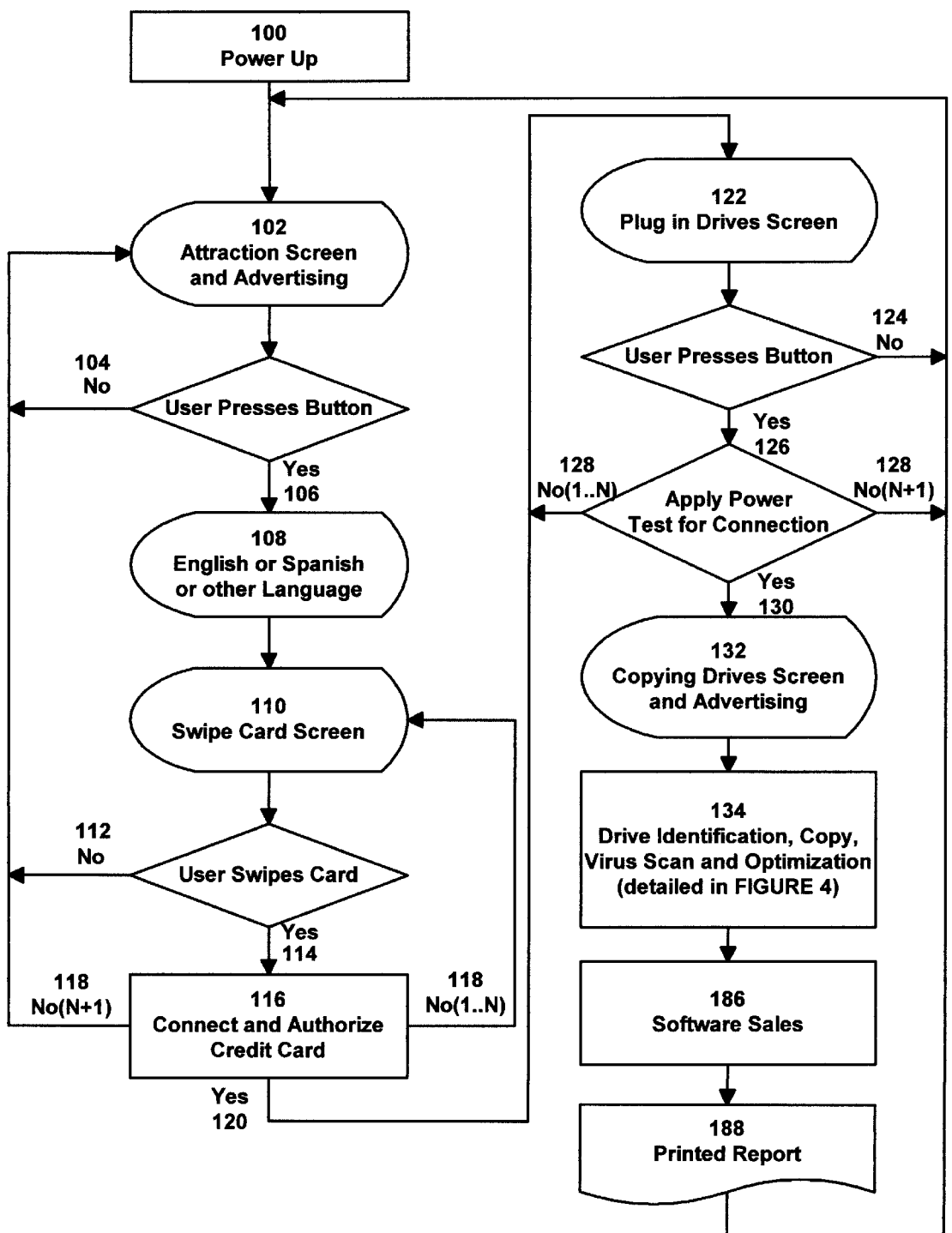
FIG. 3 is a flow-chart showing the software and operation of the stand-alone kiosk.

The features of the software and the operations of a stand-alone kiosk 10 of the invention are shown and illustrated in the flow chart of FIG. 3. Before discussing the flow-chart, it is to be noted that a series of messages are displayed on display screen 12 and played from speakers 16. As is well known in the art, such messages are first assembled in an image in RAM or buffer under the direction of the software 56 from hard disk drive 30 and are then transferred through graphics card 44 or motion video playback card 46 to the video display 12 and through an audio card to the speakers 16. The software establishes an interactive dialogue between the kiosk and the customer by displaying screens or motion video on display 12 directing questions or instructions to the customer using both audio and video. The customer, in turn, responds by touching an appropriate button 20 or otherwise following the directions displayed on the screen. This aspect of the software and the hardware means used in implementing it and the customer's responses are referred to herein as "interactive means". However, "the kiosk" will be understood as referring to the source of functions originating in the software for generating a message displayed on screen 12 or any other software functions.

Referring to FIG. 3, upon connecting the kiosk to a supply of electrical power at 100 "Power Up" the software control program 56 is loaded from the hard disk drive 30 into RAM 42 by the microprocessor 40 which performs the illustrated steps under control of the program 56. The display screen 12 displays a sales message or video "Attraction Screen" and associated sound at 102 instructing the customer to press a specified button 20, if he or she is interested in using the system to copy their hard drive. If the customer does not press the button, a "NO" output causes at 104 display of "Attraction Screen" at 102. If, however, the customer presses the button 20, a "YES" output at 106 causes the kiosk to proceed to 108.

The kiosk at 108 generates a message displayed on the screen asking the potential customer if he or she prefers English, Spanish or another language and invites the potential customer to press one of the specified buttons to select the language used by the kiosk and the customer in their interactive dialogue. If English is selected as the language of the dialogue, an "ENGLISH" output directs the program to use the English language. If Spanish is selected, a "SPANISH" output directs the program to use the Spanish Language. As is well known in the art, other languages could easily be used as well.

If a payment is required for the copy operations, the kiosk displays at 110 the "Swipe Card Screen", a video instructing the customer to swipe their payment card through the magnetic card reader 14. If nothing has been done for a predetermined interval, a "NO" output causes at 112 display of "Attraction Screen" at 102. If the customer swipes the payment card a "YES" output causes at 114 the kiosk to connect to the central office 28 with the modem device 38 and authorize the payment card transaction at 116. If the credit card transaction fails, the customer is given several attempts to try again at 110 before generating a "NO" output at 118 and causing the display of "Attraction Screen" at 102. If the payment card transaction succeeds, a "YES" output at 120 causes the operation to continue to 122.

At 122, the kiosk displays the "Plug In Drives Screen", a video instructing the customer to place the two hard drives on the work platform 22 and connect the power and data cables 24 to both drives. The video shows a close-up of how to plug in the cables, and any precautions to take while doing so. The video instructs the customer to press a designated button when the drives are plugged in. If the button is not pressed within a predetermined amount of time a "NO" output causes at 124 display of "Attraction Screen" at 102. If the button is pressed a "YES" output at 126 causes the kiosk to apply power to the hard drives by closing the contacts on relay 52 and after a predetermined amount of time to allow the drives to power up, verifies through the data cables 24 that the drives are plugged in correctly. If the drives are not plugged in correctly, a "NO" output is generated at 128 causing the kiosk to redisplay the "Plug in Drives Screen" at 122 a predetermined number of times before displaying the "Attraction Screen" at 102. If the drives are plugged in correctly, a "YES" output is generated at 130 causing the operation to continue to 132.

At 132 the kiosk displays the "Copying Drive Screen", a video that shows the progress of the drive configuration and copy process. An advertisement for other products and services may also be shown during this stage of the operations. At 134 the kiosk automatically identifies the drive make, model, size and configuration for each drive plugged into the kiosk and performs the partitioning, formatting, copying, virus scanning and optimization functions from the original computer hard drive to the replacement computer hard drive. A flowchart detailing the operations performed at 134 is shown in FIG. 4.

At 186 the customer is given the option to purchase software which can be directly installed on their replacement hard drive. When all operations are complete, a printed receipt and report is generated at 188 for the customer using the printer 18 and the purchase transaction is completed. The entire process is repeated by displaying the attraction screen at 102.

Figure 4:
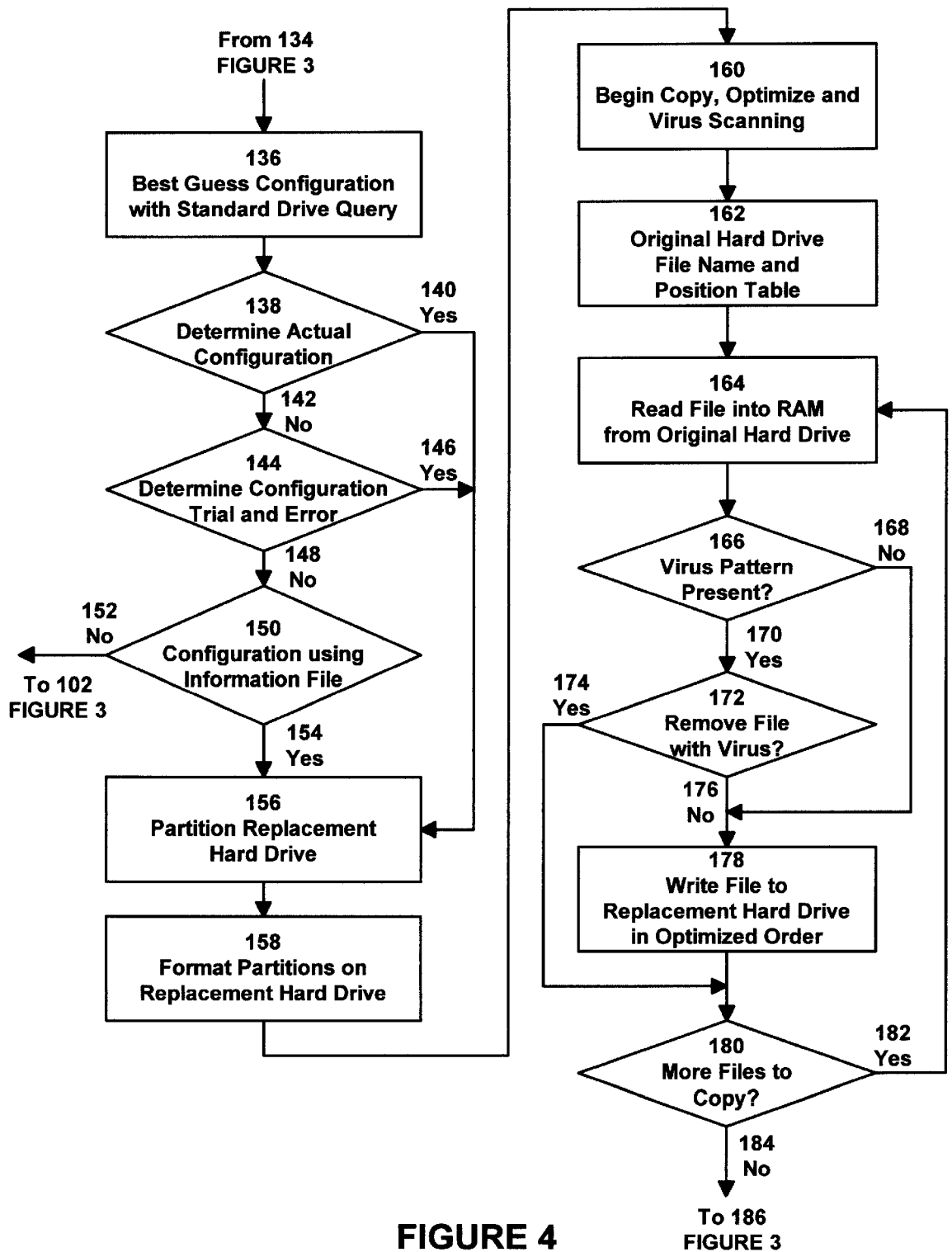
FIG. 4 is a flow-chart detailing the software which determines the computer hard drive configuration and performs the partitioning, formatting, copying, optimization and virus scanning operations of the kiosk.

FIG. 4 shows a flow-chart detailing the software and operations that identify hard drive configurations and that perform partitioning, formatting, copying, optimization and virus scanning functions from the original computer hard drive to the replacement computer hard drive. These operations are performed under control of the software control program 56.

The physical configuration and operating characteristics, including number of heads, tracks, sectors and special parameters that govern maximum performance can be determined through standard commands issued to each drive. At 136 a standard command to query the physical configuration is sent to the original and replacement computer hard drives and a best-guess drive configuration is established for each. In some cases, the data stored on the original computer hard drive may have been configured incorrectly in the customer's computer. In order to read the data from an incorrectly configured drive it is necessary to determine the actual configuration used when the data was written. Each particular operating system is known to contain certain special sectors of data that identify the actual configuration for the hard drive. At 138 enough data is read from the original computer hard drive based on the best-guess drive configuration to guarantee that these special sectors are read. Each sector is then scanned for particular patterns that positively identify them as these special sectors and the actual configuration data is read. If the actual configuration is found a "YES" output is generated at 140 causing the operation to continue at 156. If the actual configuration is not found, a "NO" output causes at 142 the operation to continue at 144.

At 144 a trial and error method is used in which each drive configuration parameter is changed incrementally until the special sectors that contain the actual configuration data are found at which point a "YES output at 146 causes the operation to continue at 156. If the special sectors containing the actual configuration data cannot be read using the trial and error method a "NO" output at 148 causes the operation to continue at 150.

At 150 the kiosk checks for the presence of a special information file on the original computer hard drive. The special information file is generated by a computer program made available to the customer which may be executed prior to the removal of the customer's original computer hard drive from the computer, and when executed will write to the original computer hard drive detailed information about the system settings and the actual hard drive configuration. If the special information file is present, a "YES" output at 154 causes the configuration information to be read and the operation continues at 156. If the special information file is not present a "NO" output at 152 causes a failure and the entire process is repeated by displaying the attraction screen at 102.

At 156 the replacement computer hard drive is partitioned with each partition containing the maximum size allowed by the customer's operating system. At 158 each partition on the replacement computer hard drive is formatted using the same formatting characteristics found on the original computer hard drive.

At 160 copying, optimization and virus scanning operations from the original drive to the replacement drive is begun. Although each of these operations are well known in the industry and software exists to perform each of these operations independently, the software in this invention is unique in that it performs the copying, optimization and virus scanning with a single pass for each block of data thus reducing the amount of time by a factor of approximately three.

At 162 a table is constructed in RAM 42 listing every file and the position of all of its parts on the original computer hard drive. At 164 the data for each file or portion of a file is read into the RAM from the original hard drive which may necessitate randomly seeking to read each portion of the file. At 166 the data in RAM is analyzed for the presence of computer viruses. A database of viruses and software to detect and remove each virus is stored on the kiosk's hard disk drive 30. If no virus is detected in a particular file, a "NO" output at 168 causes the operation to continue at 178. If a file is suspected of containing a virus, a "YES" output at 170 causes the operation to continue at 172.

At 172 the customer is shown the name of the file that is suspected of containing the computer virus and given the option of removing the file. If the customer chooses to remove the file, a "YES" output at 174 causes the operation to continue at 180. If the customer chooses not to remove the file, a "NO" output at 176 causes the operation to continue at 178.

At 178 the data in RAM is written to the replacement computer hard drive in successive positions on the replacement computer hard drive, thus optimizing the programs and data.

At 180, if more data remains to be copied from the original computer hard drive a "YES" output at 182 causes the copy operation to continue at 164. If all data has been copied from the original computer hard drive a "NO" output at 184 causes the operation to continue at 186 in FIG. 3.

Although the invention has been shown incorporated in a stand-alone self-service kiosk, it may be incorporated in hardware with other configurations. For example, the kiosk may be based on touch-screen technology. The kiosk may incorporate a telephone unit for direct customer assistance. The kiosk may communicate with a telephone network via wireless transmission techniques such as a cellular phone or modem.

While this invention has been particularly shown and described with reference to preferred embodiments, it will be appreciated by those of ordinary skill in the art that various modifications and changes may be made without departing from the spirit and scope of the invention.

We claim:

1. An interactive self-service kiosk for initializing and copying programs and data from one computer hard drive to another computer hard drive, said kiosk comprising:
   (a) a kiosk housing;
   (b) an interactive multimedia device in said kiosk housing operable for conducting a dialogue with a customer;
   (c) a computer in said kiosk housing which, in response to the interactive multimedia device:
      (1) provides means to determine type and configuration of a customer's original and replacement computer hard drives,
      (2) provides means to initialize the customer's replacement computer hard drive, and
      (3) provides means to copy the program and data information from the original computer hard drive to the replacement computer hard drive; whereby the customer can employ the kiosk to initialize the replacement computer hard drive and copy the programs and data from the original computer hard drive to the replacement computer hard drive.

2. The kiosk as recited in claim 1, wherein said kiosk further comprises:
   (a) a device in said kiosk housing for receiving a customer's payment card for use of said kiosk,
   (b) a telephone modem device in said kiosk housing and means for authorizing said payment card using said modem, and
   (c) a printer in said kiosk housing for printing receipts and/or reports for the customer.

3. The kiosk as recited in claim 2, wherein said kiosk further comprises a database of various software products which, in response to the interactive multimedia device and in conjunction with the computer in said kiosk and upon receipt of payment from the customer provides means for installing said software on the customer's replacement computer hard drive.

4. The kiosk as recited in claim 1, wherein said kiosk further comprises a removable media storage device that, in response to the interactive multimedia device and in conjunction with the computer in said kiosk provides means for creating a backup copy of the customer's original hard drive to removable media.

5. The kiosk as recited in claim 1, wherein said kiosk further comprises software for optimizing position of the programs and data on the replacement computer hard drive and in conjunction with the computer in said kiosk provides means for performing said optimization during transfer of the programs and data from the original computer hard drive to the replacement computer hard drive.

6. The kiosk as recited in claim 1, wherein said kiosk further comprises a database of known computer viruses and software to detect and remove said viruses and in conjunction with the computer in said kiosk provides means to remove said viruses from the original computer hard drive and the replacement computer hard drive.

7. The kiosk as recited in claim 1, wherein said kiosk further comprises storage means for video and audio advertisements and in conjunction with the computer and interactive multimedia device in said kiosk provides means for displaying said advertisements.

8. A method for copying programs and data from a first computer hard drive to a second computer hard drive using an interactive self-service kiosk, said kiosk comprising a housing; a computer in said housing; and an interactive device operable for conducting a dialogue with a customer, said method comprising the steps of:
   (a) instructing the customer to plug the first and second computer hard drives into the kiosk,
   (b) determining that the computer hard drives are plugged in correctly,
   (c) determining the type and configuration of each of the computer hard drives,
   (d) initializing the second computer hard drive, and
   (e) copying the programs and data from the first computer hard drive to the second computer hard drive.

9. The method as recited in claim 8, wherein said kiosk further comprises a device for receiving a customer's payment card; a telephone modem for authorizing a payment with said payment card; and a printer for printing a receipt for the customer, wherein said method further comprises the steps of:
   (a) instructing the customer to insert said payment card into said receiving device,
   (b) reading the information stored on said payment card,
   (c) connecting to a central computer with said telephone modem,
   (d) transmitting the payment card information,
   (e) receiving an authorization for payment from said central computer,
   (f) printing said receipt on said printer, and
   (g) delivering said receipt to said customer through the kiosk housing.

10. The method as recited in claim 9, wherein said kiosk further comprises a database of various software products, wherein said method further comprises:
    (a) displaying to the customer a list of software products available in the database,
    (b) soliciting a decision by the customer to purchase one or more of the software products,
    (c) accepting a payment for the software products chosen by the customer, and
    (d) installing the products chosen by the customer onto the second computer hard drive.

11. The method as recited in claim 8, wherein the step of copying the programs and data further comprises:
    (a) optimizing location of the programs and data on the second computer hard drive.

12. The method as recited in claim 8, wherein said kiosk further comprises a database of computer viruses and software to detect and remove said viruses, wherein the step of copying the programs and data further comprises:
    (a) searching the programs for the possible presence of said viruses listed in said database,
    (b) reporting the file names and virus names of those programs that may contain said viruses to the customer,
    (c) soliciting a decision by the customer to remove the viruses from each file suspected of containing viruses, and
    (d) removing the viruses from those of the files chosen by the customer which are suspected of containing viruses.

13. The method as recited in claim 8, wherein said kiosk further comprises a database of video and audio advertisements, wherein said method further comprises:
    (a) displaying of said video and audio advertisements to the customer.

14. The method as recited in claim 8, wherein said kiosk further comprises a removable media storage device for creating a backup copy of the customer's programs and data, wherein said method further comprises the steps of:
   (a) instructing the customer to insert a blank medium into the removable media storage device,
   (b) copying the programs and data from the customer's original computer hard drive to the removable media storage device, and
   (c) instructing the customer to remove the media from the removable media storage device.

15. The method as recited in claim 8, wherein said kiosk further comprises a database of computer viruses and software to detect and remove said viruses, wherein the step of copying the programs and data further comprises:
   (a) searching the programs for the possible presence of said viruses listed in said database,
   (b) reporting the file names and virus names of those programs that may contain said viruses to the customer,
   (c) soliciting a decision by the customer to remove the viruses from each file suspected of containing viruses,
   (d) removing the viruses from those of the files chosen by the customer which are suspected of containing viruses, and
   (e) optimizing location of the programs and data on the second computer hard drive.

16. A method for copying programs and data from a first computer hard drive to a second computer hard drive using a computer wherein the programs are inspected for the presence of computer viruses and positioned in optimized location on the second computer hard drive, said computer comprising a memory device; an interactive device operable for conducting a dialogue with a customer; and a database of computer viruses and software to detect and remove said viruses, said method comprising the steps of:
   (a) reading the programs and data from the first computer hard drive into the memory,
   (b) searching the programs in the memory for the presence of said viruses listed in said database,
   (c) reporting the file names and virus names of those programs that may contain viruses to the customer,
   (d) soliciting a decision by the customer to remove the viruses from each file suspected of containing viruses,
   (e) removing the viruses from those of the files chosen by the customer that are suspected of containing viruses, and
   (f) writing the programs and data from the memory to optimized location on the second computer hard drive.

* * * * *